US009890852B2

(12) United States Patent
Owatari

(10) Patent No.: US 9,890,852 B2
(45) Date of Patent: Feb. 13, 2018

(54) CONTROL DEVICE AND CONTROL METHOD FOR VEHICLE

(71) Applicant: TOYOTA JIDOSHA KABUSHIKI KAISHA, Toyota-shi, Aichi-ken (JP)

(72) Inventor: Masakazu Owatari, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 92 days.

(21) Appl. No.: 15/100,447

(22) PCT Filed: Dec. 4, 2014

(86) PCT No.: PCT/IB2014/002651
§ 371 (c)(1),
(2) Date: May 31, 2016

(87) PCT Pub. No.: WO2015/087125
PCT Pub. Date: Jun. 18, 2015

(65) Prior Publication Data
US 2016/0298760 A1    Oct. 13, 2016

(30) Foreign Application Priority Data
Dec. 9, 2013    (JP) .................................. 2013-254145

(51) Int. Cl.
*F16H 61/12*    (2010.01)
*F16H 61/02*    (2006.01)
*F16H 3/66*    (2006.01)

(52) U.S. Cl.
CPC ......... *F16H 61/12* (2013.01); *F16H 61/0206* (2013.01); *F16H 3/66* (2013.01); *F16H 2061/1268* (2013.01); *F16H 2200/0052* (2013.01); *F16H 2200/201* (2013.01); *F16H 2200/2043* (2013.01)

(58) Field of Classification Search
CPC ................. F16H 61/12; F16H 61/0206; F16H 2200/2043; F16H 2200/201; F16H 2200/0052; F16H 3/66; F16H 2061/1268
See application file for complete search history.

(56) References Cited

U.S. PATENT DOCUMENTS 4,858,501 A * 8/1989 King ....................... F16H 61/12
477/125
5,032,993 A    7/1991 Hasegawa et al.
(Continued)

FOREIGN PATENT DOCUMENTS

JP    H01-141262 A    6/1989
JP    H01-176856 A    7/1989
(Continued)

*Primary Examiner* — David J Hlavka
(74) *Attorney, Agent, or Firm* — Oliff PLC

(57) ABSTRACT

A control device for a vehicle includes an electronic control unit. The electronic control unit is configured to limit a second hydraulic pressure so that a switching valve is switched to a normal position when the following conditions i) and ii) are satisfied. The condition i) is during partial failure in which a normally closed solenoid valve is de-energized. The condition ii) is when the switching valve is switched to a failure position due to the second hydraulic pressure and downshift to a specific gear shift stage not corresponding to a current gear shift stage occurs.

5 Claims, 6 Drawing Sheets

(56) References Cited

U.S. PATENT DOCUMENTS

| | | | | |
|---|---|---|---|---|
| 5,305,663 A | * | 4/1994 | Leonard | F16H 61/0009 |
| | | | | 475/123 |
| 5,700,226 A | * | 12/1997 | Droste | F16H 61/0021 |
| | | | | 475/120 |
| 2005/0209048 A1 | | 9/2005 | Morise et al. | |
| 2011/0220823 A1 | | 9/2011 | Shimizu et al. | |
| 2014/0124324 A1 | * | 5/2014 | Wada | B60K 6/387 |
| | | | | 192/85.63 |

FOREIGN PATENT DOCUMENTS

| | | | |
|---|---|---|---|
| JP | 2005-265101 A | | 9/2005 |
| JP | 2007-263197 A | | 10/2007 |
| JP | 2010-156411 A | | 7/2010 |
| JP | 2011-190851 A | | 9/2011 |

* cited by examiner

FIG.3

|      | C1       | C2       | B1       | B2       | B3   |          |
|------|----------|----------|----------|----------|------|----------|
|      | SL1(NC)  | SL2(NC)  | SL4(NC)  | SL3(NC)  |      | SL(NC)   |
| 1ST  | ○        | ×        | ×        | ×        | ◎    | ×        |
| 2ND  | ○        | ×        | ×        | ○        | ×    | ○        |
| 3RD  | ○        | ×        | ○        | ×        | ×    | ○        |
| 4TH  | ○        | ○        | ×        | ×        | ×    | ○        |
| 5TH  | ×        | ○        | ○        | ×        | ×    | ○        |
| 6TH  | ×        | ○        | ×        | ○        | ×    | ○        |
| R    | ×        | ×        | ○        | ×        | ○    | ×        |

CONTROL DEVICE AND CONTROL METHOD FOR VEHICLE

BACKGROUND OF THE INVENTION

1. Field of the Invention

The invention relates to a control device and a control method for a vehicle. More particularly, the invention relates to a control device and a control method that are applied to a vehicle capable of forming a specific gear shift stage even in a case where an electrical failure occurs in a solenoid valve.

2. Description of Related Art

In the related art, a technique for forming a specific gear shift stage according to a gear shift stage prior to a failure in which all solenoid valves are de-energized, without using electrical control, even in a case where the failure occurs in an automatic transmission forming the gear shift stage by using the solenoid valves to control an engagement device is known (for example, refer to Japanese Patent Application Publication No. 2005-265101 (JP 2005-265101 A)). In this type of automatic transmission according to the related art, a switching valve that is switched between a normal position and a failure position according to hydraulic pressure supplied by using a normally closed (NC) solenoid valve and hydraulic pressure supplied from a normally open (NO) solenoid valve is used, and a 3-speed stage is mostly formed when the failure occurs in 1- to 4-speed stages and a 5-speed stage is mostly formed when the failure occurs in a 5- or 6-speed stage.

However, the hydraulic pressure supplied by using the NC solenoid valve is low immediately after switch from an N range to a D range, and thus the switching valve may be switched to the failure position, even during a normal operation, by the hydraulic pressure supplied from the NO solenoid valve in the automatic transmission of the related art.

In, for example, Japanese Patent Application Publication No. 2011-190851 (JP 2011-190851 A), a technique for using two relay valves, to ensure opposing pressure against hydraulic pressure supplied from a NO solenoid valve and suppress switch of a switching valve to a failure position even in a case where hydraulic pressure supplied by using a NC solenoid valve during a normal operation is insufficient is disclosed.

Although the switching valve is switched to the failure position in a case where the failure in which all of the solenoid valves are de-energized (hereinafter, also referred to as all failure) occurs in the automatic transmission according to the related art, the switching valve is not always switched to the failure position even when some of the plurality of NC solenoid valves fail (hereinafter, also referred to as partial failure). For example, the gear shift stage prior to the failure is maintained in some cases, with the switching valve remaining at the normal position, depending on a relationship between the engagement device corresponding to the solenoid valve that fails and the gear shift stage prior to the failure and the size of the hydraulic pressure supplied from the NO solenoid valve.

Although a specific low-speed stage (3-speed stage) is formed when the all failure occurs during low-speed traveling (1- to 4-speed stages) and a specific high-speed stage (5-speed stage) is formed when the all failure occurs during high-speed traveling (5- or 6-speed stage) in the automatic transmission according to the related art, the specific low-speed stage is internally established in some cases even during the high-speed traveling due to, for example, a misoperation by a driver during the partial failure.

Accordingly, in the automatic transmission according to the related art, downshift to the specific low-speed stage may occur even during the high-speed traveling when the hydraulic pressure supplied from the NO solenoid valve increases in a case, for example, where the misoperation by the driver and the partial failure occur simultaneously. As a result, over-revolution of an internal combustion engine may be caused.

It is conceivable, as in Japanese Patent Application Publication No. 2011-190851 (JP 2011-190851 A), to use a plurality of the relay valves and the like to ensure the opposing pressure against the hydraulic pressure supplied from the NO solenoid valve and suppress the switch of the switching valve to the failure position when the partial failure occurs. However, when the number of the valves and the like constituting a hydraulic circuit increases, the hydraulic circuit may become more complex, oil passages connecting the valves to each other may become more complex, and control may become more complex.

SUMMARY OF THE INVENTION

The invention provides a control device and a control method for suppressing over-revolution of an internal combustion engine, which results from downshift to a specific gear shift stage during partial failure, by using a simple configuration in a vehicle that forms the specific gear shift stage in a case where an electrical failure occurs in all solenoid valves.

A control device for a vehicle according to the invention is configured as follows. The vehicle is provided with an internal combustion engine, an automatic transmission, and the control device. The automatic transmission has a switching valve switched between a normal position and a failure position according to a first hydraulic pressure and a second hydraulic pressure. The first hydraulic pressure is hydraulic pressure supplied to the switching valve by controlling a first valve, and the second hydraulic pressure is hydraulic pressure supplied to the switching valve by controlling a second valve. The first valve is a normally closed solenoid valve, and the second valve is a normally open solenoid valve. The switching valve is configured to be switched from the normal position to the failure position during all failure in which all of the solenoid valves including the first valve and the second valve are de-energized. The automatic transmission is configured to be set to gear shift stages corresponding to traveling states of the vehicle when the switching valve is at the normal position. The automatic transmission is configured to be set to specific gear shift stages corresponding in advance to the respective gear shift stages when the switching valve is at the failure position. The control device is provided with an electronic control unit. The electronic control unit is configured to limit the second hydraulic pressure such that the switching valve is switched to the normal position when the following conditions i) and ii) are satisfied. The condition i) is during partial failure in which the first valve is de-energized. The condition ii) is when the switching valve is switched to the failure position due to the second hydraulic pressure and the automatic transmission is downshifted to the specific gear shift stage not corresponding to the current gear shift stage.

A control method for a vehicle according to the invention is configured as follows. The vehicle is provided with an internal combustion engine, an automatic transmission, and an electronic control unit. The automatic transmission has a switching valve switched between a normal position and a failure position according to a first hydraulic pressure and a second hydraulic pressure. The first hydraulic pressure is hydraulic pressure supplied to the switching valve by controlling a first valve, and the second hydraulic pressure is hydraulic pressure supplied to the switching valve by controlling a second valve. The first valve is a normally closed solenoid valve, and the second valve is a normally open solenoid valve. The switching valve is configured to be switched from the normal position to the failure position during all failure in which all of the solenoid valves including the first valve and the second valve are de-energized. The automatic transmission is configured to be set to gear shift stages corresponding to traveling states of the vehicle when the switching valve is at the normal position. The automatic transmission is configured to be set to specific gear shift stages corresponding in advance to the respective gear shift stages when the switching valve is at the failure position. The control method includes limiting the second hydraulic pressure by the electronic control unit such that the switching valve is switched to the normal position when the following conditions i) and ii) are satisfied. The condition i) is during partial failure in which the first valve is de-energized. The condition ii) is when the switching valve is switched to the failure position due to the second hydraulic pressure and the automatic transmission is downshifted to the specific gear shift stage not corresponding to the current gear shift stage.

According to the control device and the control method for a vehicle of the invention, over-revolution resulting from downshift to a specific gear shift stage can be suppressed by using a simple configuration.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a diagram illustrating an operation table showing how each gear stage, each linear solenoid, each brake, and each clutch formed in an automatic transmission correspond to each other;

DETAILED DESCRIPTION OF EMBODIMENTS

Hereinafter, embodiments of the invention will be described with reference to the accompanying drawings. In an embodiment, a case where the invention is applied to a front-engine front-drive (FF) vehicle on which an automatic transmission 3 capable of forward 6-speed gear shift is mounted will be described.

Figure 1:
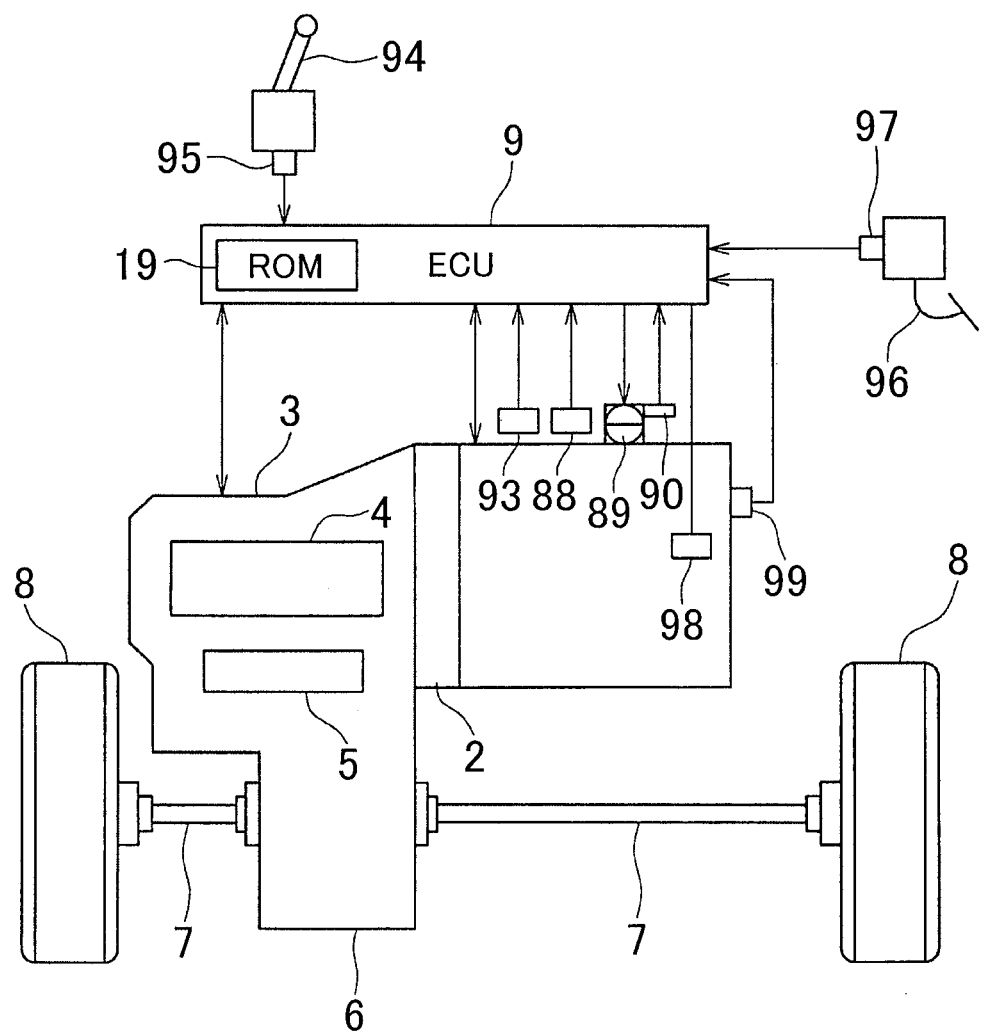
FIG. 1 is a schematic configuration diagram illustrating a vehicle on which a control device according to an embodiment of the invention is mounted.

FIG. 1 is a schematic configuration diagram illustrating the vehicle on which a control device according to this embodiment is mounted. The vehicle is provided with an engine (internal combustion engine) 1, a torque converter 2, the automatic transmission 3, a differential gear device 6, driving wheels (front wheels) 8, and an electronic control unit (ECU) 9.

The engine 1 is, for example, a four-cylinder gasoline engine. In the engine 1, an air-fuel mixture of a fuel and intake air that is injected from an injector (not illustrated) is ignited by an ignition plug (not illustrated) and is combusted in a combustion chamber (not illustrated) so that a piston (not illustrated) reciprocates due to the combustion of the air-fuel mixture in the combustion chamber and a crankshaft (not illustrated) rotates. The amount of the intake air is adjusted by an electronically controlled throttle valve 89. Opening of the throttle valve 89 can be electronically controlled independently of an operation of an accelerator pedal 96 by a driver. Ignition timing of the ignition plug is adjusted by an igniter 88.

The automatic transmission 3 includes a planetary gear mechanism 4 and a hydraulic circuit 5. The automatic transmission 3 gear-shifts a speed of the crankshaft to a desired speed by forming a desired gear stage (gear shift stage). An output rotary member 12 of the automatic transmission 3 is engaged with a differential driven gear (not illustrated) of the differential gear device 6.

A drive shaft 7 is connected to the differential gear device 6 by spline fitting or the like. Output of the engine 1 is transmitted to the right and left driving wheels 8 via the torque converter 2, the automatic transmission 3, the differential gear device 6, and the drive shaft 7.

The igniter 88, a throttle motor (not illustrated) that drives the throttle valve 89, a throttle opening sensor 90, an air flow meter 93, a position switch 95 of a shift lever 94, an accelerator opening sensor 97, a water temperature sensor 98, and a crank position sensor 99 are connected to the ECU 9.

The opening of the throttle valve 89 (throttle opening θth) is detected by the throttle opening sensor 90, and a detection signal is transmitted to the ECU 9. A position of the shift lever 94 is detected by the position switch 95, and a detection signal is transmitted to the ECU 9. The air flow meter 93 detects the amount of the air taken into the engine 1, and transmits a detection signal to the ECU 9. The accelerator opening sensor 97 detects a pedaling amount of the accelerator pedal 96 (accelerator operation amount ACC (%)), and transmits a detection signal to the ECU 9. The water temperature sensor 98 detects an engine water temperature Tw, and transmits a detection signal to the ECU 9. The ECU 9 calculates an engine speed Ne based on a pulse-shaped signal from the crank position sensor 99.

The ECU 9 executes various controls on the engine 1 and the automatic transmission 3, based on the signals that are transmitted from the various sensors and a map and a program that are stored on a read only memory (ROM) 19, so that the vehicle is in a desired traveling state. For example, ignition timing control for the ignition plug, fuel injection control for the injector, driving control for the throttle motor, in which the throttle opening θth is controlled based on the actual accelerator operation amount ACC (%) and the like from a relationship stored in advance, and the like are executed.

Figure 2:
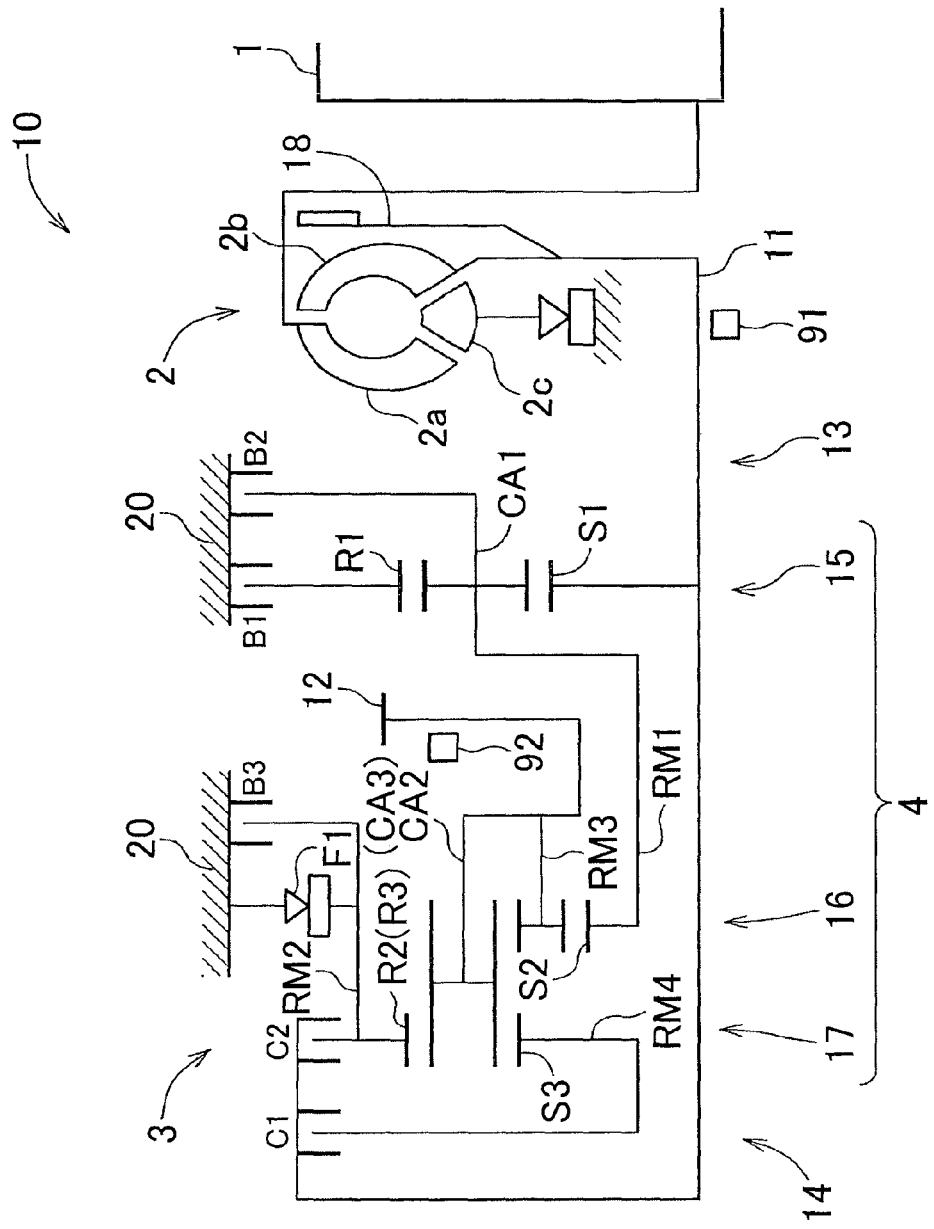
FIG. 2 is a skeleton diagram of a power transmission device that is mounted on the vehicle.

FIG. 2 is a skeleton diagram of a power transmission device 10 that is mounted on the vehicle according to this embodiment and includes the torque converter 2 and the automatic transmission 3. The automatic transmission 3 has a first transmission unit 13, which is configured mainly as a single pinion first planetary gear device 15, and a Ravigneau second transmission unit 14, which is configured mainly as a double pinion second planetary gear device 16 and a single pinion third planetary gear device 17, coaxially provided, and gear-shifts rotation of an input shaft 11 for output from the output rotary member 12. The automatic transmission 3 is configured to be substantially symmetrical to a center line. In FIG. 2, a lower half of the center line is not illustrated.

In this embodiment, the input shaft 11 is a turbine shaft of the torque converter 2 that is driven to rotate by the engine 1. The output rotary member 12 functions as a differential drive gear that is engaged with the differential driven gear so as to transmit power to the differential gear device 6.

The torque converter 2, which is provided with a pump impeller 2a that is connected to the crankshaft of the engine 1, a turbine runner 2b that is connected to the input shaft 11 of the automatic transmission 3, and a stator 2c that is connected to a housing 20 of the automatic transmission 3 via a one-way clutch, is a fluid power transmission device that transmits the power generated by the engine 1 to the automatic transmission 3 via a fluid. A lockup clutch 18, which is a direct connection clutch, is disposed between the pump impeller 2a and the turbine runner 2b. In a case where the lockup clutch 18 is in a fully engaged state, the pump impeller 2a and the turbine runner 2b integrally rotate.

FIG. 3 is a diagram illustrating an operation table showing how each gear stage, each linear solenoid, each brake, and each clutch formed in the automatic transmission 3 correspond to each other. In the drawing, "circle" represents engagement (energization in a linear solenoid valve), "double circle" represents engagement only during engine brake, and "cross" represents release (de-energization in the linear solenoid valve). A C1 clutch, a C2 clutch, a B1 brake, a B2 brake, and a B3 brake are the automatic transmission 3 which are hydraulic friction engagement devices, which are engagement-controlled by a hydraulic actuator, such as multi plate clutches and brakes. The clutches and the brakes are switched between an engagement state and a release state by current control of an SL linear solenoid valve and SL1 to SL4 linear solenoid valves of the hydraulic circuit 5.

In the automatic transmission 3, six forward gear stages from a 1-speed gear stage "1ST" to a 6-speed gear stage "6TH" and a reverse gear stage "R" are formed from combinations of connection states between respective rotation elements (sun gears S1 to S3, carriers CA1 to CA3, and ring gears R1 to R3) of the first transmission unit 13 and the second transmission unit 14. Hereinafter, a gear layout of the automatic transmission 3 will be described in detail.

The first planetary gear device 15 is provided with the three rotation elements of the sun gear S1, the carrier CA1, and the ring gear R1, and the sun gear S1 is connected to the input shaft 11. The sun gear S1 is subject to decelerating rotation, with the carrier CA1 being an intermediate output member, because the ring gear R1 is fixed to the housing 20 via the B1 brake.

A part of the second planetary gear device 16 and a part of the third planetary gear device 17 are connected to each other to constitute four rotation elements RM1 to RM4. Specifically, the sun gear S2 of the second planetary gear device 16 constitutes the first rotation element RM1, and the ring gear R2 of the second planetary gear device 16 and the ring gear R3 of the third planetary gear device 17 are connected to each other to constitute the second rotation element RM2. The carrier CA2 of the second planetary gear device 16 and the carrier CA3 of the third planetary gear device 17 are connected to each other to constitute the third rotation element RM3. The sun gear S3 of the third planetary gear device 17 constitutes the fourth rotation element RM4.

In the second planetary gear device 16 and the third planetary gear device 17, the carriers CA2, CA3 are configured as a common member and the ring gears R2, R3 are configured as a common member. A pinion gear of the third planetary gear device 17 is a Ravigneau planetary gear train that serves also as a second pinion gear of the second planetary gear device 16.

The first rotation element RM1 (sun gear S2) is integrally connected to the carrier CA1 of the first planetary gear device 15 that is the intermediate output member, and is selectively connected to the housing 20 by the B2 brake so that rotation is stopped. The second rotation element RM2 (ring gears R2, R3) is selectively connected to the input shaft 11 via the C2 clutch and is selectively connected to the housing 20 via a one-way clutch F1 and the B3 brake so that rotation is stopped. The third rotation element RM3 (carriers CA2, CA3) is integrally connected to the output rotary member 12. The fourth rotation element RM4 (sun gear S3) is selectively connected to the input shaft 11 via the C1 clutch.

In the automatic transmission 3 described above, the gear stages are set when the C1 clutch, the C2 clutch, the B1 brake, the B2 brake, and the B3 brake, which are the friction engagement devices, the one-way clutch F1, and the like are engaged or released in a predetermined state. For example, in the forward gear stage, the 1-speed gear stage "1ST" is established by the engagement between the C1 clutch and the B3 brake, the 2-speed gear stage "2ND" is established by the engagement between the C1 clutch and the B2 brake, the 3-speed gear stage "3RD" is established by the engagement between the C1 clutch and the B1 brake, the 4-speed gear stage "4TH" is established by the engagement between the C1 clutch and the C2 clutch, the 5-speed gear stage "5TH" is established by the engagement between the C2 clutch and the B1 brake, and the 6-speed gear stage "6TH" is established by the engagement between the C2 clutch and the B2 brake. The reverse gear stage "R" is established by the engagement between the B1 brake and the B3 brake. A neutral state is established when any one of the clutches and the brakes is released.

In the automatic transmission 3 according to this embodiment, the one-way clutch F1 is disposed in parallel to the B3 brake that establishes the 1-speed gear stage "1ST". Accordingly, the B3 brake does not necessarily have to be engaged during start (during acceleration). Change gear ratios of the respective gear stages are appropriately determined by using respective gear ratios (=the number of teeth of the sun gear/the number of teeth of the ring gear) ρ1, ρ2, ρ3 of the first planetary gear device 15, the second planetary gear device 16, and the third planetary gear device 17.

A speed of the input shaft 11 (turbine speed) of the automatic transmission 3 is detected by a turbine speed sensor 91, and a speed of the output rotary member 12 of the automatic transmission 3 is detected by a vehicle speed sensor 92. The current gear stage of the automatic transmission 3 can be determined based on a speed ratio (output speed/input speed) that is obtained from detection signals of the turbine speed sensor 91 and the vehicle speed sensor 92.

Figure 4:
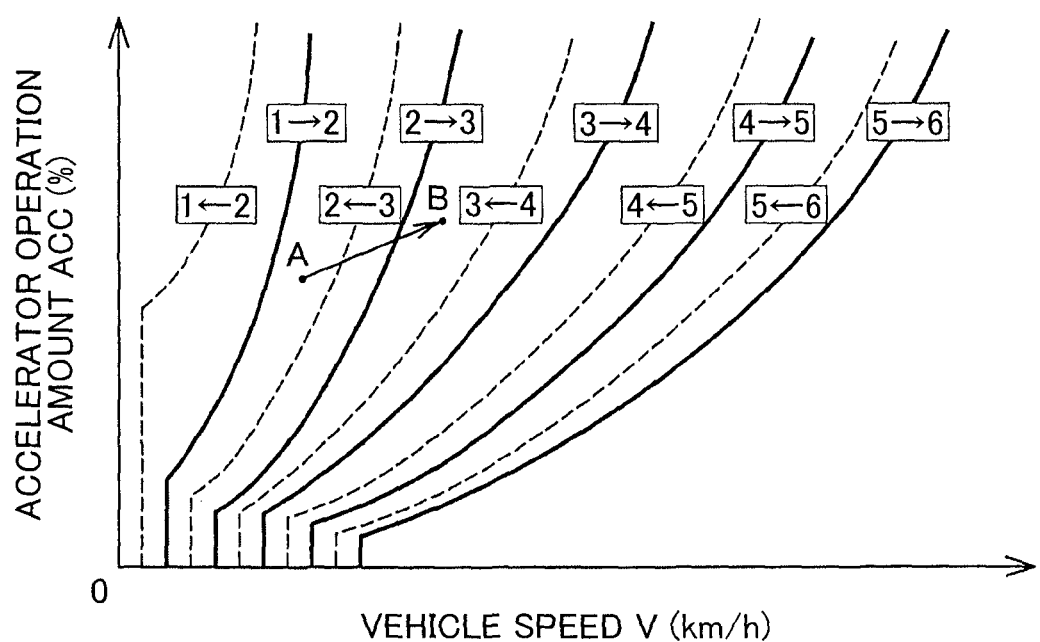
FIG. 4 is a variogram of the automatic transmission.

FIG. 4 is a variogram (gear shift map) that is stored in advance on the ROM 19 so as to control a gear shift operation by the automatic transmission 3. The ECU 9 determines the gear shift of the automatic transmission 3 from the variogram, based on the actual accelerator operation amount ACC (%) and a vehicle speed V (km/h), and controls the SL linear solenoid valve and the SL1 to SL4 linear solenoid valves the hydraulic circuit 5 is provided with and the like so that the determined gear stage and the engagement state are obtained.

Specifically, the ECU 9 calculates the vehicle speed V from the detection signal of the vehicle speed sensor 92 and calculates the accelerator operation amount ACC (%) of the accelerator pedal 96 from the detection signal of the accelerator opening sensor 97, and calculates a target gear stage, referring to the variogram in FIG. 4, based on the vehicle speed V and the accelerator operation amount ACC (%). In addition, the current gear stage is determined by obtaining the speed ratio (output speed/input speed) that is obtained from the detection signals of the turbine speed sensor 91 and the vehicle speed sensor 92, and it is determined whether or not the gear shift operation is required by comparing the current gear stage to the target gear stage.

In a case where the gear shift is not required as a result of the determination (in a case where the gear stage is appropriately set with the current gear stage being the target gear stage), a solenoid control signal for maintaining the current gear stage is output to the hydraulic circuit 5 of the automatic transmission 3.

In a case where the current gear stage is not the target gear stage, gear shift control is performed. For example, in a case where the traveling state of the vehicle changes from a situation of traveling in a state where the gear stage of the automatic transmission 3 is in the "2-speed" state to, for example, change from point A to point B illustrated in FIG. 4, a shiftup gear shift line [2→3] is crossed due to the change and the target gear stage calculated from the variogram is the "3-speed". A solenoid control signal for setting the 3-speed gear stage is output to the hydraulic circuit 5 of the automatic transmission 3, and the gear shift from the 2-speed gear stage to the 3-speed gear stage (2→3 upshift) is performed.

Figure 5:
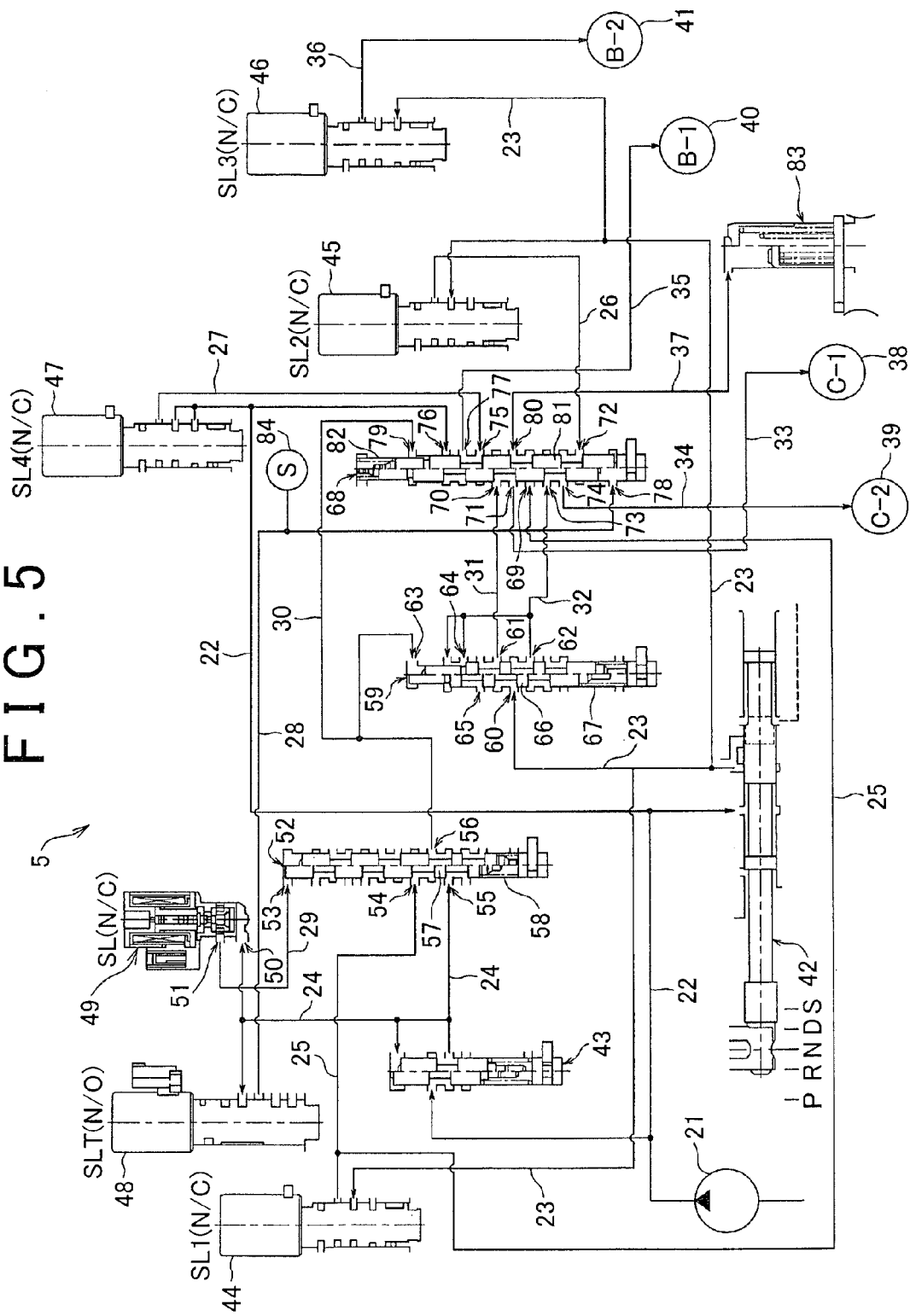
FIG. 5 is a diagram illustrating a part of a hydraulic circuit.

The hydraulic circuit 5 will be described with reference to FIG. 5. Only a part of the hydraulic circuit 5 that relates to the invention is illustrated in FIG. 5. The hydraulic circuit 5 includes an oil pump 21', a manual valve 42, a solenoid modulator valve 43, a primary regulator valve (not illustrated), an SL1 linear solenoid valve (hereinafter, also referred to as SL (1)) 44, an SL2 linear solenoid valve (hereinafter, also referred to as SL (2)) 45, an SL3 linear solenoid valve (hereinafter, also referred to as SL (3)) 46, an SL4 linear solenoid valve (hereinafter, also referred to as SL (4)) 47, an SLT linear solenoid valve (hereinafter, also referred to as SLT) 48, an SL linear solenoid valve (hereinafter, also referred to as SL) 49, a solenoid relay valve 52, a clutch control valve 59, a sequence valve (switching valve), 68, a B3 control valve (not illustrated), and a C1 accumulator 83.

The oil pump 21 is connected to, the crankshaft of the engine 1, and is driven to generate hydraulic pressure when the crankshaft rotates. The hydraulic pressure that is generated by the oil pump 21 is adjusted by the primary regulator valve to become line pressure. The primary regulator valve is operated by using the hydraulic pressure controlled by the SLT 48 (hereinafter, also referred to as SLT pressure) as pilot pressure. The line pressure increases as the SLT pressure increases. The line pressure is supplied to the manual valve 42, the solenoid modulator valve 43, the SL (4) 47, and the sequence valve 68 via a PL oil passage 22.

The manual valve 42 is connected to the shift lever 94. A position of a spool of the manual valve 42 is changed to a parking position (P), a reverse position (R), a neutral position (N), a drive position (D), or a sport position (S) according to the position of the shift lever 94. In a case where the spool of the manual valve 42 is at the drive position (D), the line pressure that is supplied to the manual valve 42 is supplied to the SL (1) 44, the SL (2) 45, the SL (3) 46, and the clutch control valve 59 via a D-range oil passage 23 as D-range pressure. In a case where the spool of the manual valve 42 is at the reverse position (R), the supplied line pressure is supplied to an R-range oil passage (not illustrated).

The solenoid modulator valve 43 adjusts the line pressure to a constant pressure. The hydraulic pressure that is adjusted to a constant pressure by the solenoid modulator valve 43 (hereinafter, also referred to as modulator pressure) is supplied to the SLT 48, the SL 49, and the solenoid relay valve 52 via a modulator oil passage 24.

The SL (1) 44 is a normally closed linear solenoid valve that blocks the hydraulic pressure during de-energization. The D-range pressure is supplied to the SL (1) 44 via the D-range oil passage 23. The SL (1) 44 is connected to the solenoid relay valve 52 and the sequence valve 68 via an SL1 oil passage 25. The SL (1) 44 controls the hydraulic pressure that is supplied to a servo of the C1 clutch (hereinafter, also referred to as C1 hydraulic servo) 38.

The SL (2) 45 is a normally closed linear solenoid valve that blocks the hydraulic pressure during de-energization. The D-range pressure is supplied to the SL (2) 45 via the D-range oil passage 23. The SL (2) 45 is connected to the sequence valve 68 via an SL2 oil passage 26. The SL (2) 45 controls the hydraulic pressure that is supplied to a servo of the C2 clutch (hereinafter, also referred to as C2 hydraulic servo) 39.

The SL (3) 46 is a normally closed linear solenoid valve that blocks the hydraulic pressure during de-energization. The D-range pressure is supplied to the SL (3) 46 via the D-range oil passage 23. The SL (3) 46 is connected to a servo of the B2 brake (hereinafter, also referred to as B2 hydraulic servo) 41 via a B2 oil passage 36, and controls the hydraulic pressure that is supplied to B2 hydraulic servo 41.

The SL (4) 47 is a normally closed linear solenoid valve that blocks the hydraulic pressure during de-energization. The line pressure is supplied to the SL (4) 47 via the PL oil passage 22. The SL (4) 47 is connected to the sequence valve 68 via an SL4 oil passage 27. The SL (4) 47 controls the hydraulic pressure that is supplied to a servo of the B1 brake (hereinafter, also referred to as B1 hydraulic servo) 40.

The SLT 48 is a normally open linear solenoid valve that is capable of supplying the hydraulic pressure during de-energization. The ECU 9 sets a target SLT pressure according to torque information that is generated based on the accelerator operation amount ACC (%), the amount of the intake air of the engine 1, the engine water temperature Tw, the engine speed. Ne, and the like, and produces the SLT pressure by controlling the SLT 48 to match with the target SLT pressure. As a general rule, the SLT pressure is adjusted to increase as the accelerator operation amount ACC (%) increases. The SLT pressure that is adjusted by the SLT 48 is supplied to the sequence valve 68 and the primary regulator valve via an SLT oil passage 28. An oil pressure switch 84 that directly detects the SLT pressure is disposed in the SLT oil passage 28. During system start, the SLT 48 is energized so as to control the SLT pressure. The SLT 48 is a normally open solenoid valve, and thus the SLT pressure reaches the highest value during de-energization and the SLT pressure during energization is lower than the SLT pressure during de-energization.

The SL 49 is a normally closed linear solenoid valve that blocks the hydraulic pressure during de-energization. The SL 49 includes an input port 50 and an output port 51. The input port 50 is connected to the modulator oil passage 24. The output port 51 is connected to the solenoid relay valve 52 via an SL oil passage 29. As illustrated in the operation table in FIG. 3, the SL 49 is de-energized in a case where the 1-speed gear stage is formed. The input port 50 and the output port 51 of the SL 49 are blocked during de-energization. The SL 49 is energized in a case where the 2- to 6-speed gear stages are formed. During energization, the input port 50 and the output port 51 of the SL 49 communicate with each other and the modulator pressure that is supplied to the input port 50 is output, from the output port 51 and is supplied to the solenoid relay valve 52.

The solenoid relay valve 52 includes an SL port (R) 53, an SL1 port (R) 54, a modulator port 55, and an output port (R) 56. In addition, the solenoid relay valve 52 has a spool 57, and a spring 58 that biases the spool 57 to an upper side in FIG. 5.

The SL port (R) 53 is connected to the output port 51 of the SL 49 via the SL oil passage 29. Accordingly, the modulator pressure is supplied to the SL port (R) 53 when the SL 49 is energized.

The SL1 port (R) 54 is connected to the SL (1) 44 via the SL1 oil passage 25. The SL1 port (R) 54 communicates with or is blocked from the output port (R) 56 depending on a movement of the spool 57.

The modulator port 55 is connected to the solenoid modulator valve 43 via the modulator oil passage 24. The modulator port 55 communicates with or is blocked from the output port (R) 56 depending on the movement of the spool 57.

The output port (R) 56 communicates with any one of the SL1 port (R) 54 and the modulator port 55 when the spool 57 moves. The output port (R) 56 is connected to the clutch control valve 59 and the sequence valve 68 via a relay oil passage 30.

The solenoid relay valve 52 is controlled by the hydraulic pressure that is supplied to the SL port (R) 53 and a biasing force of the spring 58. Specifically, the SL 49 is de-energized and the hydraulic pressure is not supplied to the SL port (R) 53 in a case where the 1-speed gear stage is formed, and thus the solenoid relay valve 52 is in a state illustrated on the left side in FIG. 5 due to the biasing force of the spring 58. In this state, the SL1 port (R) 54 and the output port (R) 56 communicate with each other and the hydraulic pressure that is adjusted to a constant pressure by the SL (1) 44 (hereinafter, also referred to as SL1 pressure) is supplied to the clutch control valve 59 and the sequence valve 68 via the relay oil passage 30.

In a case where the 2- to 6-speed gear stages are formed, the SL 49 is energized and the modulator pressure is supplied to the SL port (R) 53, and thus the modulator pressure exceeds the biasing force of the spring 58 and the solenoid relay valve 52 is in a state illustrated on the right side in FIG. 5. In this state, the modulator port 55 and the output port (R) 56 communicate with each other and the modulator pressure is supplied to the clutch control valve 59 and the sequence valve 68 via the relay oil passage 30.

The clutch control valve 59 includes a D port 60, a low-speed stage port (C) 61, a high-speed stage port (C) 62, a relay port (C) 63, a lock port 64, and a drain port 65. In addition, the clutch control valve 59 has a spool 66, and a spring 67 that biases the spool, 66 to the upper side in FIG. 5.

The D port 60 is connected to the manual valve. 42 via the D-range oil passage 23. The D port 60 communicates with any one of the low-speed stage port (C) 61 and the high-speed stage port (C) 62 depending on a movement of the spool 66.

In a case where the 1- to 4-speed gear stages are formed, the low-speed stage port (C) 61 communicates with the D port 60. In a case where the high-speed stage port (C) 62 communicates with the D port 60, the low-speed stage port (C) 61 communicates with the drain port 65. The low-speed stage port (C) 61 is connected to the sequence valve 68 via a low-speed stage oil passage 31.

In a case where the 5-speed or 6-speed gear stage is formed, the high-speed stage port (C) 62 communicates with the D port 60. The high-speed stage port (C) 62 is connected to the sequence valve 68 via a high-speed stage oil passage 32.

The relay port (C) 63 is connected to the output port (R) 56 of the solenoid relay valve 52 via the relay oil passage 30. Accordingly, the SL1 pressure is supplied to the relay port (C) 63 in a case where the 1-speed gear stage is formed, and the modulator pressure is supplied to the relay port (C) 63 in a case where the 2- to 6-speed gear stages are formed.

The lock port 64 is connected to the high-speed stage oil passage 32. In a case where the low-speed stage port (C) 61 communicates with the D port 60, the lock port 64 communicates with the drain port 65.

The clutch control valve 59 is controlled mainly by the hydraulic pressure that is supplied to the relay port (C) 63 and a biasing force of the spring 67 although the clutch control valve 59 is also controlled by the hydraulic pressure that is supplied to the lock port 64. The spring 67 is adjusted so that the biasing force of the spring 67 is larger than the SL1 pressure or the modulator pressure corresponding to the 2- to 4-speed gear stages and is smaller than the modulator pressure corresponding to the 5-speed or 6-speed gear stage.

In a case where the 1-speed gear stage is formed, the SL1 pressure is supplied to the relay port (C) 63. In this case, the biasing force of the spring 67 exceeds the SL1 pressure, and the clutch control valve 59 is in a state illustrated on the left side in FIG. 5.

In a case where the 2- to 4-speed gear stages are formed, the modulator pressure corresponding to the 2- to 4-speed gear stages is supplied to the relay port (C) 63. Even in this case, the biasing force of the spring 67 exceeds the modulator pressure and the clutch control valve 59 is in a state illustrated on the left side in FIG. 5.

As described above, the SLT pressure increases as the accelerator operation amount ACC (%) increases. Accordingly, the SLT pressure increases when the driver steps on the accelerator pedal 96, and the line pressure, which is adjusted by the primary regulator valve that is operated by using the SLT pressure as the pilot pressure, also increases. When the line pressure increases, the modulator pressure, which is adjusted from the line pressure by the solenoid modulator valve 43, also increases.

Accordingly, the modulator pressure that is increased to a value corresponding to the 5-speed or 6-speed gear stage is supplied to the relay port (C) 63 in a case where the 5-speed or 6-speed gear stage is formed by the driver stepping on the accelerator pedal 96. In this case, the modulator pressure exceeds the biasing force of the spring 67 and the clutch control valve 59 is in a state illustrated on the right side in FIG. 5.

Herein, the hydraulic pressure that is supplied from the high-speed stage oil passage 32 to the lock port 64 (hereinafter, also referred to as lock pressure) is discharged from the drain port 65 in a case where the low-speed stage port (C) 61 communicates with the D port 60. Accordingly, the lock pressure does not act at all in a case where 1- to 4-speed gear stages (low-speed stages) are formed.

In a case where the 5-speed or 6-speed gear stage (high-speed stage) is formed, the lock pressure acts as an opposing force against the biasing force of the spring 67 with the modulator pressure. Accordingly, the lock pressure that is equal to the modulator pressure corresponding to the 5-speed or 6-speed gear stage exceeds the biasing force of the spring 67 and the clutch control valve 59 is maintained in a state illustrated on the right side in FIG. 5, even when electrical failure occurs and the modulator pressure is not supplied to the relay port (C) 63, in a case where the 5-speed or 6-speed gear stage is formed.

The lock pressure is discharged from the drain port 65 in a case where the low-speed stage port (C) 61 communicates with the D port 60. In addition, the lock pressure is discharged from the lock port 64 in a case where the D-range pressure is discharged from the D-range oil passage 23 through an operation of the manual valve 42 to the neutral position (N) or the like.

The sequence valve 68 includes an SL1 port (S) 69, a low-speed stage port (S) 70, a C1 port 71, an SL2 port 72, a high-speed stage port (S) 73, a C2 port 74, an SL4 port 75, a PL port 76, a B1 port 77, an SLT port 78, a relay port (S) 79, and an accumulator port 80. In addition, the sequence valve 68 has a spool 81, and a spring 82 that biases the spool 81 to a lower side in FIG. 5.

The SL1 port (S) 69 is connected to the SL (1) 44 via the SL1 oil passage 25. The low-speed stage port (S) 70 is connected to the low-speed stage port (C) 61 via the low-speed stage oil passage 31. The C1 port 71 is connected to the C1 hydraulic servo 38 via a C1 oil passage 33. The C1 port 71 communicates with any one of the SL1 port (S) 69 and the low-speed stage port (S) 70 depending on a movement of the spool 81.

The SL2 port 72 is connected to the SL (2) 45 via the SL2 oil passage 26. The high-speed stage port (S) 73 is connected to the high-speed stage port (C) 62 via the high-speed stage oil passage 32. The C2 port 74 is connected to the C2 hydraulic servo 39 via a C2 oil passage 34. The C2 port 74 communicates with any one of the SL2 port 72 and the high-speed stage port (S) 73 depending on the movement of the spool 81.

The SL4 port 75 is connected to the SL (4) 47 via the SL4 oil passage 27. The PL port 76 is connected to the PL oil passage 22. The B1 port 77 is connected to the B1 hydraulic servo 40 via a B1 oil passage 35. The B1 port 77 communicates with any one of the SL4 port 75 and the PL port 76 depending on the movement of the spool 81.

The SLT port 78 is connected to the SLT 48 via the SLT oil passage 28. The relay port (S) 79 is connected to the output port (R) 56 of the solenoid relay valve 52 via the relay oil passage 30. The accumulator port 80 is connected to the C1 accumulator 83 via an accumulator oil passage 37.

The sequence valve 68 is controlled by the SLT pressure that is supplied to the SLT port 78, the hydraulic pressure that is supplied to the relay port (S) 79 (the SL1 pressure or the modulator pressure), and a biasing force of the spring 82. More specifically, in the sequence valve 68, the SL1 pressure or the modulator pressure is used, in addition to the biasing force of the spring 82, as an opposing force against the SLT pressure.

The sequence valve 68 is configured to be in a state illustrated on the right side in FIG. 5 with a resultant force of the biasing force of the spring 82 and the SL1 pressure or the modulator pressure exceeding the SLT pressure insofar as the SL1 pressure or the modulator pressure is supplied to the relay port (S) 79. The SLT pressure does not always exceed the biasing force of the spring 82 even in a case where both the SL1 pressure and the modulator pressure are not supplied to the relay port (S) 79. The sequence valve 68 is configured to be switched to a state illustrated on the left side in FIG. 5 with the SLT pressure exceeding the biasing force of the spring 82 in, for example, a case where the SLT pressure is increased to larger than or equal to a predetermined value (hereinafter, also referred to as a limp mode forming pressure) by the driver stepping on the accelerator pedal 96 and a case where the SLT pressure reaches the highest value with the SLT 48 de-energized.

The SL1 pressure or the modulator pressure that is supplied to the relay port (S) 79 is an example of "a first hydraulic pressure supplied by controlling the normally closed solenoid valve" of the invention. The SLT pressure that is supplied to the SLT port 78 is an example of "a second hydraulic pressure supplied from the normally open solenoid valve" of the invention. The state of the sequence valve 68 illustrated on the right side in FIG. 5 is an example of a "normal position" of the invention. The state of the sequence valve 68 illustrated on the left side in FIG. 5 is an example of a "failure position" of the invention.

Hereinafter, each of the gear stages that are formed by the hydraulic circuit 5 described above will be described.

In a case where the 1-speed gear stage is formed during a normal operation, the SL (1) 44 is energized and the SL 49, the SL (2) 45, the SL (3) 46, and the SL (4) 47 are de-energized as illustrated in the operation table in FIG. 3. When the SL 49 is de-energized, no hydraulic pressure is supplied to the SL port (R) 53, and the solenoid relay valve 52 is in a state illustrated on the left side in FIG. 5 due to the biasing force of the spring 58. In this state, the SL1 port (R) 54 and the output port (R) 56 communicate with each other and the modulator port 55 and the output port (R) 56 are blocked from each other. Accordingly, when the SL (1) 44 is energized, the SL1 pressure is supplied to the relay port (C) 63 of the clutch control valve 59 and the relay port (S) 79 of the sequence valve 68 via the SL1 oil passage 25, the SL1 port (R) 54, the output port (R) 56, and the relay oil passage 30. In addition, the SL1 pressure is supplied to the SL1 port (S) 69 of the sequence valve 68 via the SL1 oil passage 25.

Although the SL1 pressure is supplied to the relay port (C) 63 of the clutch control valve 59, the clutch control valve 59 is in a state illustrated on the left side in FIG. 5 with the biasing force of the spring 67 exceeding the SL1 pressure. In this state, the D port 60 and the low-speed stage port (C) 61 communicate with each other and the D port 60 and the high-speed stage port (C) 62 are blocked from each other. Accordingly, the D-range pressure is supplied to the low-speed stage port (S) 70 of the sequence valve 68.

Although the SLT pressure is supplied from the SLT 48 to the SLT port 78 of the sequence valve 68 via the SLT oil passage 28, the sequence valve 68 is in a state illustrated on the right side in FIG. 5 (normal position) since the SL1 pressure is supplied to the relay port (S) 79. In this state, the SL1 port (S) 69 and the C1 port 71 communicate with each other and the low-speed stage port (S) 70 and the C1 port 71 are blocked from each other. The SL1 pressure is supplied to the SL1 port (S) 69, and thus the SL1 pressure is supplied to the C1 hydraulic servo 38 and the C1 clutch is engaged. In this case, the C1 port 71 and the accumulator port 80 communicate with each other and the C1 hydraulic servo 38 and the C1 accumulator 83 are connected via the accumulator oil passage 37, and thus the C1 clutch can be smoothly engaged.

In this state, the SL2 port 72 and the C2 port 74 communicate with each other. However, no hydraulic pressure is supplied to the C2 hydraulic servo 39 since the SL (2) 45 is de-energized, and the C2 clutch is in the release state. In addition, although the PL port 76 and the B1 port 77 are blocked from each other and the SL4 port 75 and the B1 port 77 communicate with each other in this state, no hydraulic pressure is supplied to the B1 hydraulic servo 40 since the SL (4) 47 is de-energized, and the B1 brake is in the release state. In addition, the SL (3) 46 is de-energized in this state, and thus no hydraulic pressure is supplied to the B2 hydraulic servo 41, and the B2 brake is in the release state.

The 1-speed gear stage is formed when only the C1 clutch is engaged and the C2 clutch, the B1 brake, and the B2 brake are in the release state as described above.

In a case where the 2-speed gear stage is formed during the normal operation, the SL 49, the SL (1) 44, and the SL (3) 46 are energized and the SL (2) 45 and the SL (4) 47 are de-energized as illustrated in the operation table in FIG. 3. When the SL 49 is energized, the modulator pressure is supplied to the SL port (R) 53, the modulator pressure exceeds the biasing force of the spring 58, and the solenoid relay valve 52 is in a state illustrated on the right side in FIG. 5. In this state, the SL1 port (R) 54 and the output port (R) 56 are blocked from each other and the modulator port 55 and the output port (R) 56 communicate with each other. Accordingly, the modulator pressure is supplied to the relay port (C) 63 of the clutch control valve 59 and the relay port (S) 79 of the sequence valve 68 via the modulator oil passage 24, the modulator port 55, the output port (R) 56, and the relay oil passage 30. In addition, the SL1 pressure is supplied to the SL1 port (S) 69 of the sequence valve 68 via the SL1 oil passage 25 since the SL (1) 44 is energized.

Although the modulator pressure is supplied to the relay port (C) 63 of the clutch control valve 59, the clutch control valve 59 is in a state illustrated on the left side in FIG. 5 with the biasing force of the spring 67 exceeding the modulator pressure. In this state, the D port 60 and the low-speed stage port (C) 61 communicate with each other and the D port 60 and the high-speed stage port (C) 62 are blocked from each other. Accordingly, the D-range pressure is supplied to the low-speed stage port (S) 70 of the sequence valve 68.

Although the SLT pressure is supplied from the SLT 48 to the SLT port 78 of the sequence valve 68 via the SLT oil passage 28, the sequence valve 68 is in a state illustrated on the right side in FIG. 5 (normal position) since the modulator pressure is supplied to the relay port (S) 79.

In this state, the SL1 port (S) 69 and the C1 port 71 communicate with each other and the low-speed stage port (S) 70 and the C1 port 71 are blocked from each other. Since the SL1 pressure is supplied to the SL1 port (S) 69, the SL1 pressure is supplied to the C1 hydraulic servo 38 and the C1 clutch is engaged.

Although the SL2 port 72 and the C2 port 74 communicate with each other in this state, no hydraulic pressure is supplied to the C2 hydraulic servo 39 and the C2 clutch is in the release state since the SL (2) 45 is de-energized. In addition, although the PL port 76 and the B1 port 77 are blocked from each other and the SL4 port 75 and the B1 port 77 communicate with each other in this state, no hydraulic pressure is supplied to the B1 hydraulic servo 40 and the B1 brake is in the release state since the SL (4) 47 is de-energized. In addition, the SL (3) 46 is de-energized in this state, and thus the hydraulic pressure that is adjusted to a constant pressure by the SL (3) 46 (hereinafter, also referred to as SL3 pressure) is supplied to the B2 hydraulic servo 41 and the B2 brake is engaged.

The 2-speed gear stage is formed when the C1 clutch and the B2 brake are engaged and the C2 clutch and the B1 brake are in the release state as described above.

A case where the 3-speed gear stage is formed during the normal operation is different from the case where the 2-speed gear stage is formed only in that the SL (3) 46 is de-energized and the SL (4) 47 is energized. As in the case of the formation of the 2-speed gear stage, the sequence valve 68 is in a state illustrated on the right side in FIG. 5 (normal position), and thus the SL4 port 75 and the B1 port 77 communicate with each other, the hydraulic pressure that is adjusted to a constant pressure by the SL (4) 47 (hereinafter, also referred to as SL4 pressure) is supplied from the SL (4) 47 to the B1 hydraulic servo 40, and the B1 brake is engaged. Since the SL (3) 46 is de-energized, no hydraulic pressure is supplied to the B2 hydraulic servo 41 and the B2 brake is in the release state. The other operations are the same as in the case of the formation of the 2-speed gear stage. Accordingly, detailed description thereof will not be repeated herein.

The 3-speed gear stage is formed when the C1 clutch and the B1 brake are engaged and the C2 clutch and the B2 brake are in the release state as described above.

A case where the 4-speed gear stage is formed during the normal operation is different from the case where the 2-speed gear stage is formed only in that the SL (3) 46 is de-energized and the SL (2) 45 is energized. As in the case of the formation of the 2-speed gear stage, the sequence valve 68 is in a state illustrated on the right side in FIG. 4 (normal position), and thus the SL2 port 72 and the C2 port 74 communicate with each other, the hydraulic pressure that is adjusted to a constant pressure by the SL (2) 45 (hereinafter, also referred to as SL2 pressure) is supplied from the SL (2) 45 to the C2 hydraulic servo 39, and the C2 clutch is engaged. Since the SL (3) 46 is de-energized, no hydraulic pressure is supplied to the B2 hydraulic servo 41 and the B2 brake is in the release state. The other operations are the same as in the case of the formation of the 2-speed gear stage. Accordingly, detailed description thereof will not be repeated herein.

The 4-speed gear stage is formed when the C1 clutch and the C2 clutch are engaged and the B1 brake and the B2 brake are in the release state as described above.

In a case where the 5-speed gear stage is formed during the normal operation, the SL 49, the SL (2) 45, and the SL (4) 47 are energized and the SL (1) 44 and the SL (3) 46 are de-energized as illustrated in the operation table in FIG. 3. When the SL 49 is energized, the modulator pressure is supplied to the SL port (R) 53, and thus the modulator pressure exceeds the biasing force of the spring 58 and the solenoid relay valve 52 is in a state illustrated on the right side in FIG. 5. In this state, the SL1 port (R) 54 and the output port (R) 56 are blocked from each other and the modulator port 55 and the output port (R) 56 communicate with each other. Accordingly, the modulator pressure is supplied to the relay port (C) 63 of the clutch control valve 59 and the relay port (S) 79 of the sequence valve 68 via the modulator oil passage 24, the modulator port 55, the output port (R) 56, and the relay oil passage 30. In addition, the SL2 pressure is supplied to the SL2 port 72 of the sequence valve 68 via the SL2 oil passage 26 since the SL (2) 45 is energized. In addition, the SL4 pressure is supplied to the SL4 port 75 of the sequence valve 68 via the SL4 oil passage 27 since the SL (4) 47 is energized.

Since the modulator pressure corresponding to the 5-speed gear stage is supplied to the relay port (C) 63 of the clutch control valve 59, the modulator pressure exceeds the biasing force of the spring 67 and the clutch control valve 59 is in a state illustrated on the right side in FIG. 5. In this state, the D port 60 and the high-speed stage port (C) 62 communicate with each other and the D port 60 and the low-speed stage port (C) 61 are blocked from each other. Accordingly, the D-range pressure is supplied to the high-speed stage port (S) 73 of the sequence valve 68.

In this case, a part of the D-range pressure that flows in the high-speed stage oil passage 32 returns to the lock port 64 of the clutch control valve 59. A force that maintains the clutch control valve 59 in a state illustrated on the right side in FIG. 5, acts in this manner.

Although the SLT pressure is supplied from the SLT 48 to the SLT port 78 of the sequence valve 68 via the SLT oil passage 28, the sequence valve 68 is in a state illustrated on the right side in FIG. 5 (normal position) since the modulator pressure is supplied to the relay port (S) 79.

In this state, the SL2 port 72 and the C2 port 74 communicate with each other and the high-speed stage port (S) 73 and the C2 port 74 are blocked from each other. Since the SL2 pressure is supplied to the SL2 port 72, the SL2 pressure is supplied to the C2 hydraulic servo 39 and the C2 clutch is engaged. In addition, although the SL1 port (S) 69 and the C1 port 71 communicate with each other in this state, no hydraulic pressure is supplied to the C1 hydraulic servo 38 since the SL (1) 44 is de-energized, and the C1 clutch is in the release state. In addition, the PL port 76 and the B1 port 77 are blocked from each other and the SL4 port 75 and the B1 port 77 communicate with each other in this state. Since the SL (4) 47 is energized, the SL4 pressure is supplied to the B1 hydraulic servo 40 and the B1 brake is engaged. In addition, the SL (3) 46 is de-energized in this state, and thus no hydraulic pressure is supplied to the B2 hydraulic servo 41 and the B2 brake is in the release state.

The 5-speed gear stage is formed when the C2 clutch and the B1 brake are engaged and the C1 clutch and the B2 brake are in the release state as described above.

A case where the 6-speed gear stage is formed during the normal operation is different from the case where the 5-speed gear stage is formed only in that the SL (4) 47 is de-energized and the SL (3) 46 is energized. As in the case of the formation of the 5-speed gear stage, the sequence valve 68 is in a state illustrated on the right side in FIG. 5 (normal position), and thus the SL4 port 75 and the B1 port 77 communicate with each other. However, no hydraulic pressure is supplied to the B1 hydraulic servo 40 since the SL (4) 47 is de-energized, and the B1 brake is in the release state. When the SL (3) 46 is energized, the SL3 pressure is supplied from the SL (3) 46 to the B2 hydraulic servo 41 and the B2 brake is engaged. The other operations are the same as in the case of the formation of the 5-speed gear stage. Accordingly, detailed description thereof will not be repeated herein.

The 6-speed gear stage is formed when the C2 clutch and the B2 brake are engaged and the C1 clutch and the B1 brake are in the release state as described above.

Next, the gear stage that is formed in a case where an electrical failure in which all of the linear solenoid valves are de-energized (all failure) occurs will be described.

It is assumed that the all failure occurs in a case where any one of the 1- to 4-speed gear stages is formed. In this case, no hydraulic pressure is supplied to the SL port (R) 53 since the SL 49 is de-energized, and the solenoid relay valve 52 is in a state illustrated on the left side in FIG. 5 due to the biasing force of the spring 58. Accordingly, the solenoid relay valve 52 is maintained in a state illustrated on the left side in FIG. 5 in a case where the 1-speed gear stage is formed, and the solenoid relay valve 52 is switched from a state illustrated on the right side in FIG. 5 to a state illustrated on the left side in FIG. 5 in a case where any one of the 2- to 4-speed gear stages is formed.

In this state, the SL1 port (R) 54 and the output port (R) 56 communicate with each other and the modulator port 55 and the output port (R) 56 are blocked from each other. Since all of the linear solenoid valves are de-energized, the SL1 pressure that is supplied from the SL (1) 44 is discharged from a drain port (not illustrated) of the SL (1) 44 in a case where the 1-speed gear stage is formed. In a case where any one of the 2- to 4-speed gear stages is formed, the supply of the modulator pressure from the output port (R) 56 is stopped since the modulator port 55 and the output port (R) 56 are blocked from each other. Accordingly, both the SL1 pressure and the modulator pressure are not supplied to the relay port (C) 63 of the clutch control valve 59 and the relay port (S) 79 of the sequence valve 68. In addition, the SL1 pressure is not supplied to the SL1 port (S) 69 of the sequence valve 68.

In this case, the clutch control valve 59 is maintained in a state illustrated on the left side in FIG. 5 due to the biasing force of the spring 67. Accordingly, the D port 60 and the low-speed stage port (C) 61 communicate with each other and the D port 60 and the high-speed stage port (C) 62 are blocked from each other as in a case where any one of the 1- to 4-speed gear stages is formed during the normal operation. The D-range pressure is supplied to the low-speed stage port (S) 70 of the sequence valve 68 in this manner.

Since both SL1 pressure and the modulator pressure are not supplied to the relay port (S) 79 of the sequence valve 68 and the SLT 48 is de-energized, the SLT pressure that reaches the highest value is supplied to the SLT port 78, and thus the SLT pressure exceeds the biasing force of the spring 82 and the sequence valve 68 is switched to a state illustrated on the left side in FIG. 5 (failure position).

In, this state, the low-speed stage port (S) 70 and the C1 port 71 communicate with each other and the SL1 port (S) 69 and the C1 port 71 are blocked from each other. Since the D-range pressure is supplied to the low-speed stage port (S) 70, the D-range pressure is supplied to the C1 hydraulic servo 38 and the C1 clutch is engaged. In addition, the SL2 port 72 and the C2 port 74 are blocked from each other and the high-speed stage port (S) 73 and the C2 port 74 communicate with each other in this state. However, no hydraulic pressure is supplied to the C2 hydraulic servo 39 since no hydraulic pressure is supplied to the high-speed stage port (S) 73, and the C2 clutch is in the release state. In addition, the SL4 port 75 and the B1 port 77 are blocked from each other and the PL port 76 and the B1 port 77 communicate with each other in this state. Since the line pressure is supplied to the PL port 76, the line pressure is supplied to the B1 hydraulic servo 40, and the B1 brake is engaged. In addition, the SL (3) 46 is de-energized in this state, and thus no hydraulic pressure is supplied to the B2 hydraulic servo 41, and the B2 brake is in the release state.

The 3-speed gear stage (specific gear shift stage) is formed when the C1 clutch and the B1 brake are engaged and the C2 clutch and the B2 brake are in the release state as described above. In other words, upshift to the 3-speed gear stage occurs in a case where the 1-speed gear stage or the 2-speed gear stage is formed, the 3-speed gear stage is maintained in a case where the 3-speed gear stage is formed, and downshift to the 3-speed gear stage occurs in a case where the 4-speed gear stage is formed. In this manner, the vehicle can continue traveling even in a case where the all failure occurs during low-speed traveling (when the 1- to 4-speed gear stages are formed).

It is assumed that the all failure occurs in a case where the 5-speed or 6-speed gear stage is formed. In this case, no hydraulic pressure is supplied to the SL port (R) 53 since the SL 49 is de-energized, and thus the solenoid relay valve 52 is in a state illustrated on the left side in FIG. 5 due to the biasing force of the spring 58. Accordingly, the solenoid relay valve 52 is switched from a state illustrated on the right side in FIG. 5 to a state illustrated on the left side in FIG. 5.

In this state, the SL1 port (R) 54 and the output port (R) 56 communicate with each other and the modulator port 55 and the output port (R) 56 are blocked from each other. Since the modulator port 55 and the output port (R) 56 are blocked from each other, the supply of the modulator pressure from the output port (R) 56 is stopped. In addition, the SL1 pressure is not supplied from the SL (1) 44 since all of the linear solenoids are de-energized. Accordingly, both the SL1 pressure and the modulator pressure are not supplied to the relay port (C) 63 of the clutch control valve 59 and the relay port (S) 79 of the sequence valve 68.

Although both the SL1 pressure and the modulator pressure are not supplied to the clutch control valve 59 in this case, a force that maintains the spool 81 on the lower side in FIG. 5 acts due to the hydraulic pressure that is supplied to the lock port 64, and thus the clutch control valve 59 is maintained in a state illustrated on the right side in FIG. 5. Accordingly, the D port 60 and the high-speed stage port (C) 62 communicate with each other and the D port 60 and the low-speed stage port (C) 61 are blocked from each other as in the case where the 5-speed or 6-speed gear stage is formed during the normal operation. The D-range pressure is supplied to the high-speed stage port (S) 73 of the sequence valve 68 in this manner.

Since both the SL1 pressure and the modulator pressure are, not supplied to the relay port (S) 79 of the sequence valve 68 and the SLT 48 is de-energized, the SLT pressure that reaches the highest value is supplied to the SLT port 78, the SLT pressure exceeds the biasing force of the spring 82, and the sequence valve 68 is switched to a state illustrated on the left side in FIG. 5 (failure position).

In this state, the high-speed stage port (S) 73 and the C2 port 74 communicate with each other and the SL2 port 72 and the C2 port 74 are blocked from each other. Since the D-range pressure is supplied to the high-speed stage port (S) 73, the D-range pressure is supplied to the C2 hydraulic servo 39, and the C2 clutch is engaged. In addition, the SL1 port (S) 69 and the C1 port 71 are blocked from each other and the low-speed stage port (S) 70 and the C1 port 71 communicate with each other in this state. However, since no hydraulic pressure is supplied to the low-speed stage port (S) 70, no hydraulic pressure is supplied to the C1 hydraulic servo 38, and the C1 clutch is in the release state. In addition, the SL4 port 75 and the B1 port 77 are blocked from each other and the PL port 76 and the B1 port 77 communicate with each other in this state. Since the line pressure is supplied to the PL port 76, the line pressure is supplied to the B1 hydraulic servo 40, and the B1 brake is engaged. In addition, the SL (3) 46 is de-energized in this state, and thus no hydraulic pressure is supplied to the B2 hydraulic servo 41, and the B2 brake is in the release state.

The 5-speed gear stage (specific gear shift stage) is formed when the C2 clutch and the B1 brake are engaged and the C1 clutch and the B2 brake are in the release state as described above. In other words, the 5-speed gear stage is maintained in a case where the 5-speed gear stage is formed, and downshift to the 5-speed gear stage occurs in a case where the 6-speed gear stage is formed. In this manner, the vehicle can continue traveling even in a case where the all failure occurs during high-speed traveling (when the 5-speed or 6-speed gear stage is formed).

The limp mode is also formed in the vehicle of this embodiment so that the vehicle can be re-started even in a case where the all failure occurs. Specifically, the D-range pressure is discharged from the D-range oil passage 23, the lock pressure is discharged from the lock port 64, and the clutch control valve 59 is configured to be in a state illustrated on the left side in FIG. 5 due to the biasing force of the spring 67 when the manual valve 42 is operated to the neutral position after the occurrence of the all failure. Accordingly, in the vehicle of this embodiment, the hydraulic pressure is supplied from the D-range oil passage 23 to the C1 hydraulic servo 38, the 3-speed gear stage is formed, and the vehicle can be re-started when the supply of the hydraulic pressure to the D-range oil passage 23 is resumed.

As described above, the limp mode is formed in the vehicle of this embodiment so that the vehicle can be re-started even in a case where the all failure occurs. However, the following problem may arise in a case where some of the normally closed linear solenoid valves blocking the hydraulic pressure during de-energization fails (hereinafter, also referred to as partial failure).

It is assumed that the partial failure in which the SL 49, which is the normally closed linear solenoid valve, is de-energized occurs during high-speed traveling (for example, when the 6-speed gear stage is formed). In this case, no hydraulic pressure is supplied to the SL port (R) 53, and thus the solenoid relay valve 52 is switched from a state illustrated on the right side in FIG. 5 to a state illustrated on the left side in FIG. 5 due to the biasing force of the spring 58.

In this state, the SL1 port (R) 54 and the output port (R) 56 communicate with each other and the modulator port 55 and the output port (R) 56 are blocked from each other, and thus the supply of the modulator pressure from the output port (R) 56 is stopped. In addition, the SL1 pressure is not supplied from the SL (1) 44 since the 6-speed gear stage is formed. Accordingly, both the SL1 pressure and the modulator pressure are not supplied to the relay port (C) 63 of the clutch control valve 59 and the relay port (S) 79 of the sequence valve 68.

In this case, both the SL1 pressure and the modulator pressure are not supplied to the clutch control valve 59. However, the force that maintains the spool 81 on the lower side in FIG. 5 acts due to the lock pressure, and thus the clutch control valve 59 is maintained in a state illustrated on the right side in FIG. 5. In addition, although both the SL1 pressure and the modulator pressure are not supplied to the relay port (S) 79 of the sequence valve 68, the sequence valve 68 is maintained in a state illustrated on the right side in FIG. 5 due to the biasing force of the spring 82 insofar as the SLT pressure is lower than the limp mode forming pressure.

In this manner, the 6-speed gear stage can be maintained as in the normal operation even when the SL 49 fails insofar as the SLT pressure is lower than the limp mode forming pressure.

A case where the driver in this situation moves the shift lever 94 from a D (drive) range to an N (neutral) range in, for example, a misoperation or by intention on a long downhill on an expressway and the like and then returns the shift lever 94 back to the D range while maintaining the high-speed state is assumed.

In this case, the sequence valve 68 is maintained in a state illustrated on the right side in FIG. 5 (normal position) insofar as the SLT pressure is lower than the limp mode forming pressure. The 6-speed gear stage can be, formed again based on the variogram in FIG. 4 depending on the accelerator operation amount ACC (%) and the vehicle speed V (km/h) during the returning of the shift lever 94 to the D range.

In order to move the shift lever 94 from the D range to the N range, the manual valve 42 is operated to the neutral position (N), the D-range pressure is discharged from the D-range oil passage 23, and the lock pressure is discharged from the lock port 64 as a result. Since both the SL1 pressure and the modulator pressure are not supplied to the clutch control valve 59, the clutch control valve 59 is switched to a state illustrated on the left side in FIG. 5, that is, a state where the D port 60 and the low-speed stage port (C) 61 communicate with each other and the D port 60 and the high-speed stage port (C) 62 are blocked from each other, despite the formation of the 6-speed gear stage.

When the driver steps on the accelerator pedal 96 and the SLT pressure increases to larger than or equal to the limp mode forming pressure in this situation, the sequence valve 68 is switched to a state illustrated on the left side in FIG. 5 and downshift from the 6-speed gear stage to the 3-speed gear stage occurs at once. In this manner, the all failure causes the 5-speed gear stage to be formed and the partial failure causes the limp mode to be unexpectedly formed to result in downshift to the 3-speed gear stage during the traveling in the 6-speed gear stage. As a result, over-revolution of the engine 1 may occur. This problem may also arise when the 5-speed gear stage is formed.

In this embodiment, the sequence valve 68 is switched to the normal position in a case where downshift to the specific gear shift stage not corresponding to the current gear stage occurs during the partial failure. Specifically, the ECU 9 is configured to limit the SLT pressure so that the sequence valve 68 is switched to the normal position in a case where the sequence valve 68 is switched to the failure position due to the SLT pressure, downshift to the specific gear shift stage not corresponding to the current gear shift stage occurs, and the engine speed Ne becomes larger than or equal to a predetermined speed during the partial failure in which the SL 49 is de-energized. Hereinafter, this configuration will be described.

In this embodiment, the 3-speed gear stage that is formed during the all failure with respect to the 1- to 4-speed gear stages and the 5-speed gear stage that is formed during the all failure with respect to the 5- or 6-speed gear stage are examples of the "specific gear shift stages corresponding in advance to the respective gear shift stages" of the invention. In this embodiment, the 3-speed gear stage that is formed in the limp mode during the partial failure with respect to the 5-speed or 6-speed gear stage is an example of the "specific gear shift stage not corresponding to the current gear shift stage" of the invention.

The ECU 9 acquires the current gear stage of the automatic transmission 3 based on the speed ratio (output speed/input speed) that is obtained from the detection signals of the turbine speed sensor 91 and the vehicle speed sensor 92 regardless of whether or not the partial failure actually occurs during the traveling of the vehicle, and determines whether or not the current gear stage is a gear stage that is higher than the specific gear shift stage (3-speed gear stage) which is formed in the limp mode. This determination is performed because the over-revolution of the engine 1 does not occur in the first place if the current gear stage is equal to or below the 3-speed gear stage.

If the current gear stage is a gear stage that is higher than the 3-speed gear stage, the over-revolution of the engine 1 may occur, and thus the ECU 9 calculates a synchronization turbine speed Nt in the specific gear shift stage at the current vehicle speed V. Specifically, the ECU 9 calculates the synchronization turbine speed Nt in a case where the 3-speed gear stage is assumed to be formed at the current (for example, when the 6-speed gear stage is formed) vehicle speed V based on the speed of the output rotary member 12 of the automatic transmission 3 detected by the vehicle speed sensor 92 and the respective gear ratios ρ1, ρ2, and ρ3 of the first planetary gear device 15, the second planetary gear device 16, and the third planetary gear device 17. The ECU 9 determines whether or not the calculated synchronization turbine speed Nt is in an over-revolution area (area of the turbine speed where the over-revolution of the engine 1 may occur that is defined based on an experiment or the like), and initiates monitoring of the engine speed Ne if the synchronization turbine speed Nt is in the over-revolution area.

The possibility of the synchronization turbine speed Nt in a case where the 3-speed gear stage is assumed to be formed at the vehicle speed V during the formation of the 4-speed gear stage being in the over-revolution area is extremely low, and thus the monitoring of the engine speed Ne is initiated in a case where the current gear stage is the 5- or 6-speed gear stage in the vehicle on which the automatic transmission 3 capable of forward 6-speed gear shift is mounted as in this embodiment.

A case where the SL 49 fails, the SLT pressure increases by the driver stepping on the accelerator pedal 96, and the sequence valve 68 is switched to the failure position (state illustrated on the left side in FIG. 5) is assumed. In this case, the ECU 9 determines that the limp mode is formed during the partial failure to lead to the over-revolution if the engine speed Ne is larger than or equal to a predetermined speed. The predetermined speed is a speed for determining the possibility of the occurrence of the over-revolution of the engine 1 due to downshift. In this embodiment, the predetermined speed is a speed that is below an over-revolution speed (highest allowable speed of the internal combustion engine defined based on an experiment or the like) and exceeds a fuel cut speed (speed at which the fuel injection from the injector is stopped) which is set to be lower than the over-revolution speed. This determination is possible because of the following reason.

In this embodiment, the resultant force of the biasing force of the spring 82 and the SL1 pressure or the modulator pressure exceeds the SLT pressure in any case insofar as the SL 49 is normal and the SL1 pressure or the modulator pressure is supplied to the relay port (S) 79 of the sequence valve 68, and thus the limp mode is not formed. If the system is normal, the fuel injection from the injector is stopped when the engine speed Ne becomes larger than or equal to the fuel cut speed, and thus the engine speed Ne is below a predetermined speed in any case. In this embodiment, the 3-speed gear stage is formed in a case where the all failure occurs during low-speed traveling (when the 1- to 4-speed gear stages are formed) and the 5-speed gear stage is formed in a case where the all failure occurs during high-speed traveling (when the 5- or 6-speed gear stage is formed), and thus no downshift from the 6-speed gear stage to the 3-speed gear stage occurs during the all failure. Therefore, it can be determined that the limp mode is formed during the partial failure to lead to the over-revolution if the engine speed Ne becomes larger than or equal to a predetermined speed during high-speed traveling.

The case where it is determined that the limp mode is formed during the partial failure to lead to the over-revolution includes a case where the engine speed Ne becomes larger than or equal to a predetermined speed during the course of the downshift (before the completion of the downshift) to the 3-speed gear stage.

When it is determined that the limp mode is formed during the partial failure to lead to the over-revolution, the ECU 9 limits the target SLT pressure below the limp mode forming pressure and performs energization control on the SLT 48 based on the limited target SLT pressure. The SLT pressure is limited through the limitation of the target SLT pressure in this manner, and the sequence valve 68 returns to the normal position. In this manner, the gear stage prior to the switch of the sequence valve 68 to the failure position, that is, the 6-speed gear stage commensurate with the current vehicle speed V, is formed, and thus the over-revolution of the engine 1 attributable to the downshift to the specific gear shift stage during the partial failure can be suppressed.

In a case where the SLT pressure is lowered to cause engagement torque capacity of the friction engagement device (for example, the C2 clutch and the B2 brake in the case of the 6-speed gear stage) to be insufficient in this case, the ECU 9 reduces output torque of the engine 1. Specifically, the ECU 9 performs torque down control, by controlling the throttle valve 89 to a closing side, controlling the igniter 88 for ignition timing retardation, or controlling the throttle valve 89 to a closing side and controlling the igniter 88 for ignition timing retardation at the same time, so that the output torque of the engine 1 corresponds to the engagement torque capacity achieved by the limited target SLT pressure.

Figure 6:
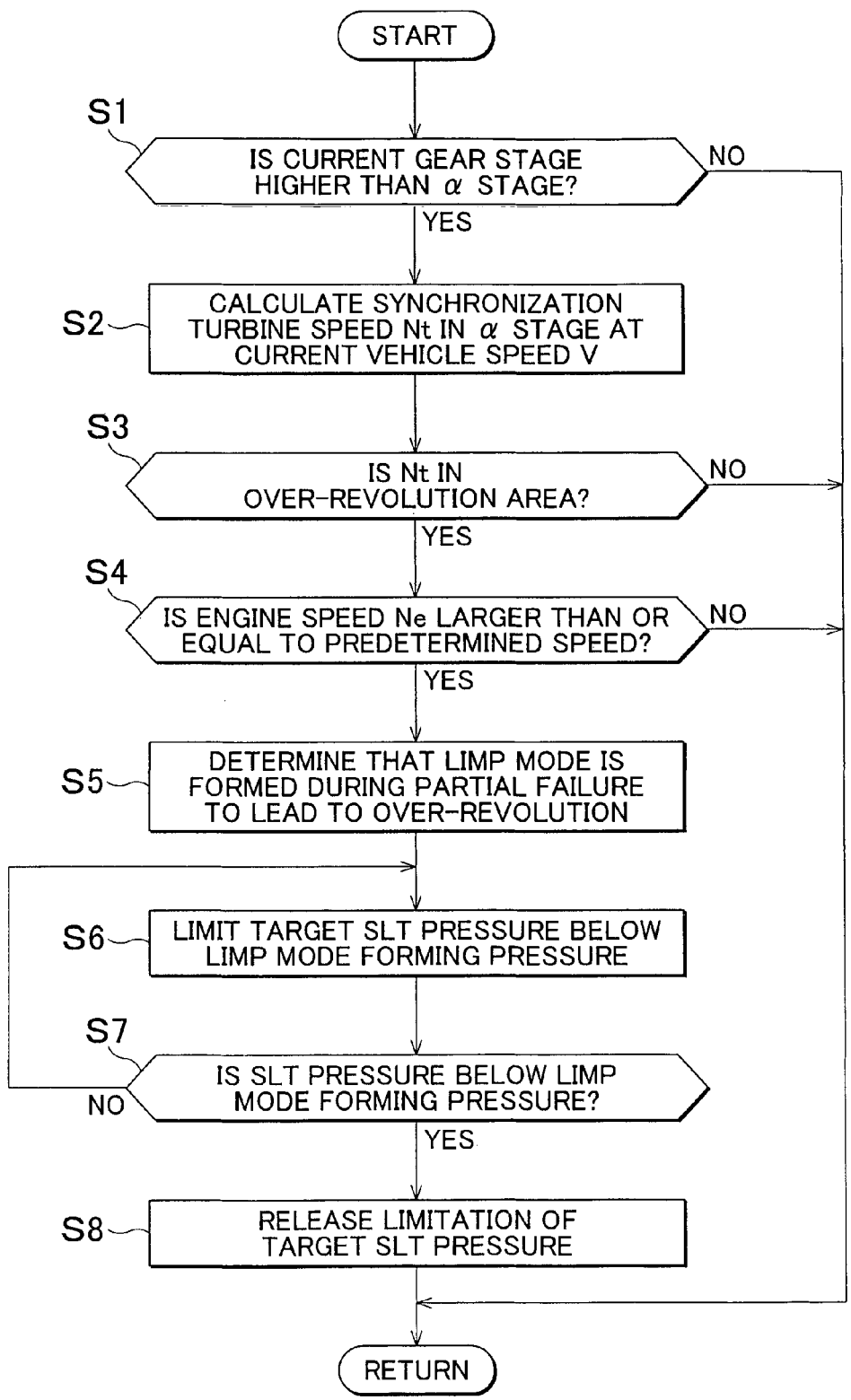
FIG. 6 is a flowchart illustrating an example of hydraulic control during partial failure.

Next, a procedure of hydraulic control during the partial failure according to this embodiment will be described along the flowchart in FIG. 6. This flowchart is repeated at predetermined time intervals.

In Step S1, the ECU 9 acquires the current gear stage of the automatic transmission 3 based on the speed ratio obtained from the detection signals of the turbine speed sensor 91 and the vehicle speed sensor 92, and determines whether or not the current gear stage is a gear stage that is higher than an α stage (specific gear shift stage formed in the limp mode (3-speed gear stage in this embodiment)). In a case where it is determined NO in Step S1, that is, in a case where the current gear stage is the 1- to 3-speed gear stages, the over-revolution of the engine 1 does not occur even when the limp mode is unexpectedly formed during the partial failure, and thus the process proceeds to RETURN as it is. The process proceeds to Step S2 in a case where it is determined YES in Step S1.

In Step S2, the ECU 9 calculates the synchronization turbine speed Nt in the α stage at the current vehicle speed. Specifically, the ECU 9 calculates the synchronization turbine speed Nt in a case where the α stage (3-speed gear stage) is assumed to be formed at the current (for example, when the 6-speed gear stage is formed) vehicle speed V based on the speed of the output rotary member 12 of the automatic transmission 3 detected by the vehicle, speed sensor 92 and the respective gear ratios ρ1, ρ2, and ρ3 of the first to third planetary gear devices 15 to 17.

In Step S3, the ECU 9 determines whether or not the synchronization turbine speed Nt in a case where the α stage is assumed to be formed, which is calculated in Step S2, is in the over-revolution area. The process proceeds to RETURN as it is in a case where it is determined NO in Step S3, for example, in a case where the current gear stage is the 4-speed gear stage and the synchronization turbine speed Nt is not in the over-revolution area despite the formation of the 3-speed gear stage. The process proceeds to Step S4 in a case where it is determined YES in Step S3, for example, in a case where the current gear stage is the 5- or 6-speed gear stage and the synchronization turbine speed Nt is in the over-revolution area when the 3-speed gear stage is formed.

In Step S4, the ECU 9 determines whether or not the current engine speed Ne is larger than or equal to a predetermined speed. In a case where it is determined NO in Step S4, the process proceeds to RETURN as it is. In a case where it is determined YES in Step S4, the process proceeds to Step S5.

In Step S5, the ECU 9 determines that the limp mode is formed during the partial failure to lead to the over-revolution. In Step S6, the ECU 9 limits the target SLT pressure below the limp mode forming pressure regardless of the accelerator operation amount ACC (%) by the driver. Then, the ECU 9 performs energization control on the SLT 48 based on the limited target SLT pressure.

In Step S7, the ECU 9 determines whether or not the SLT pressure that is directly detected by the oil pressure switch 84 is below the limp mode forming pressure. In a case where it is determined NO in Step S7, the process returns to Step S6, and the control for limiting the target SLT pressure below the limp mode forming pressure continues. In a case where it is determined YES in Step S7, the sequence valve 68 returns to the normal position, the over-revolution of the engine 1 is avoided, the process proceeds to Step S8, and the process proceeds to RETURN after the limitation of the target SLT pressure is released.

The sequence valve 68 is switched to a state illustrated on the right side in FIG. 5 and, for example, the 6-speed gear stage is formed in a case where it is determined YES in Step S7, that is, if the SLT pressure is below the limp mode forming pressure. In this case, the ECU 9 reduces the output torque of the engine 1 by, for example, controlling the throttle valve 89 to the closing side in a case where the engagement torque capacity of the C2 clutch and the B2 brake becomes insufficient due to the limitation of the target SLT pressure.

In the embodiment described above, the limitation of the target SLT pressure is released in a case where the SLT pressure that is detected by the oil pressure switch 84 is below the limp mode forming pressure. However, the sequence valve 68 may be switched to the failure position and downshift to the 3-speed gear stage may occur immediately after the SLT pressure rises again due to the stepping on the accelerator pedal 96 or the like. In this case, the target SLT pressure is to be limited again so that the sequence valve 68 is switched to the normal position. However, in this case, the switch of the sequence valve 68 to the failure position and the switch of the sequence valve 68 to the normal position may be repeated insofar as the 5- or 6-speed gear stage is maintained.

In this modification example, the limitation of the SLT pressure continues, even after the sequence valve 68 is switched to the normal position, until the gear stage that is set according to the traveling state of the vehicle becomes a target gear shift stage corresponding in advance to the 3-speed gear stage (specific gear shift stage) which is formed in the limp mode during the partial failure. Specifically, the ECU 9 is configured to continue limiting the target SLT pressure, even after the sequence valve 68 is switched to the normal position (state illustrated on the right side in FIG. 5), until the current gear stage is the 4-speed or lower gear stage where the over-revolution of the engine 1 does not occur despite downshift to the 3-speed gear stage. In this manner, the repetition of the switch of the sequence valve 68 to the failure position and the switch of the sequence valve 68 to the normal position can be suppressed.

The invention is not limited to the embodiment described above, and can be embodied in various forms without departing from the spirit and principal features of the invention.

A case where the invention is applied to a FF vehicle on which the automatic transmission 3 capable of forward 6-speed gear shift is mounted has been described in the embodiment described above. However, the invention is not limited thereto, and may also be applied to a vehicle on which an automatic transmission capable of forward 5-speed gear shift, forward 8-speed gear shift, or the like is mounted and a front-engine rear-drive (FR) vehicle.

A case where the invention is applied to a vehicle provided with the gasoline engine 1 has been described in the embodiment described above. However, the invention is not limited thereto, and may also be applied to a vehicle provided with a diesel engine.

In the embodiment described above, the target SLT pressure is limited below the limp mode forming pressure so that the sequence valve 68 is switched to the normal position in a case where the engine speed Ne is larger than or equal to a predetermined speed. However, the invention is not limited thereto. For example, the target SLT pressure may be limited immediately in a case where downshift from the 6-speed gear stage to the 3-speed gear stage is to occur. In the embodiment described above, the target SLT pressure is limited below the limp mode forming pressure so that the sequence valve 68 is switched to the normal position in a case where the synchronization turbine speed Nt is in the over-revolution area and the engine speed Ne is larger than or equal to a predetermined speed. However, the invention is not limited thereto. For example, the target SLT pressure may be limited immediately in a case where downshift from the 6-speed gear stage to the 3-speed gear stage is to occur. In this case, downshift is prevented, and any increase in the engine speed Ne can be prevented in advance.

A case where an electrical failure occurs only in the SL 49 has been described in the embodiment described above. However, the invention is not limited thereto. For example, the invention can be applied also to a case where an electrical failure occurs in the SL 49 and the SL (1) 44 during the formation of the 5-speed or 6-speed gear stage and a case where an electrical failure occurs in the SL 49 and the SL(3) 46 during the formation of the 5-speed gear stage.

As described above, the embodiment described above is merely an example in any aspect and is not to be construed as limiting the invention. Any modification and change pertaining to a scope equivalent to the scope of claims are within the scope of the invention.

According to the invention, the over-revolution attributable to downshift to the specific gear shift stage can be suppressed by using the simple configuration. The invention is highly advantageous when applied to a control device for a vehicle that is capable of forming a specific gear shift stage in a case where an electrical failure occurs in a solenoid valve.

Herein, the control device for a vehicle according to the invention will be further described. The control device returns the switching valve to the normal position in the case of downshift to the specific gear shift stage not corresponding to the current gear shift stage during the partial failure.

Specifically, the invention is for a control device that is applied to a vehicle which is provided with an internal combustion engine, and an automatic transmission having a switching valve switched between a normal position and a failure position according to a first hydraulic pressure supplied by controlling a normally closed solenoid valve and a second hydraulic pressure supplied from a normally open solenoid valve.

The switching valve is configured to be switched from the normal position at which gear shift stages set according to traveling states of the vehicle are formed to the failure position at which specific gear shift stages corresponding in advance to the respective gear shift stages are formed during all failure in which all of the solenoid valves including the normally closed and normally open solenoid valves are de-energized.

The control device limits the second hydraulic pressure so that the switching valve is switched to the normal position in a case where the switching valve is switched to the failure position due to the second hydraulic pressure and downshift to the specific gear shift stage not corresponding to the current gear shift stage occurs during the partial failure in which the normally closed solenoid valve is de-energized.

Herein, examples of the "specific gear shift stages corresponding in advance to the respective gear shift stages" include a specific low-speed stage (any one of 1 to M) that is formed in a case where the all failure occurs during the formation of 1- to M-speed stages (low-speed stages) in the automatic transmission capable of forward N-speed gear shift, M and N being integers (1<M<N), and may also include a specific high-speed stage (any one of M+1 to N) that is formed in a case where the all failure occurs during the formation of M+1- to N-speed stages (high-speed stages). When it comes to the "specific gear shift stages", three gear shift stages may be set to correspond to the low-speed stage, a medium-speed stage, and the high-speed stage. Alternatively, four or more gear shift stages may be set.

The "current gear shift stage" means a gear shift stage that is formed when the switching valve is in the normal position immediately before the switching valve is switched to the failure position due to the second hydraulic pressure during the partial failure.

In the example described above, the "downshift to the specific gear shift stage not corresponding to the current gear shift stage" means downshift to the specific low-speed stage during the formation of the M+1- to N-speed stages (high-speed stages).

According to this configuration, the second hydraulic pressure is limited so that the switching valve is switched (returns) to the normal position in a case where the switching valve is switched to the failure position due to the second hydraulic pressure and unexpected downshift to the specific gear shift stage is to occur during the partial failure, and thus the gear shift stage prior to the switch of the switching valve to the failure position can be, formed. In this manner, the gear shift stage commensurate with the current vehicle speed is formed, and thus the over-revolution of the internal combustion engine attributable to downshift to the specific gear shift stage during the partial failure can be suppressed.

The switching valve returns to the normal position by limiting the second hydraulic pressure that is supplied from the normally open solenoid valve, without increasing, the number of valves or the like constituting the hydraulic circuit, and thus the hydraulic circuit, the oil passage, and the control can be simplified.

As described above, the over-revolution of the internal combustion engine attributable to downshift to the specific gear shift stage during the partial failure can be suppressed by using the simple configuration.

In the control device, the second hydraulic pressure is limited so that the switching valve is switched to the normal position in a case where downshift to the specific gear shift stage causes the output speed of the internal combustion engine to become larger than or equal to a predetermined speed during the partial failure.

Herein, the "predetermined speed" is a speed for determining the possibility of the occurrence of the over-revolution of the internal combustion engine due to downshift. For example, the predetermined speed may be a speed that is below the highest allowable speed of the internal combustion engine defined based on an experiment or the like (over-revolution speed) and exceeds a fuel cut speed (speed at which the fuel injection from the injector is stopped) which is set to be lower than the highest allowable speed.

The "case where downshift to the specific gear shift stage causes the output speed of the internal combustion engine to become larger than or equal to a predetermined speed" includes a case where the output speed of the internal combustion engine becomes larger than or equal to a predetermined speed through downshift to the specific gear shift stage because the output speed of the internal combustion engine prior to the switch of the switching valve to the failure position is relatively low and a case where the output speed of the internal combustion engine becomes larger than or equal to a predetermined speed during the course of the downshift (before the completion of the downshift) to the specific gear shift stage because the output speed of the internal combustion engine prior to the switch of the switching valve to the failure position is relatively high.

According to this configuration, the second hydraulic pressure is limited not in the case of simple downshift to the specific gear shift stage not corresponding to the current gear shift stage but in a case where downshift to the specific gear shift stage causes the output speed of the internal combustion engine to become larger than or equal to a predetermined speed, and thus the limitation of the second hydraulic pressure can become less frequent. In this manner, the over-revolution of the internal combustion engine attributable to downshift to the specific gear shift stage can be suppressed while, for example, deterioration in drivability caused by lowering of the output torque of the internal combustion engine attributable to hydraulic pressure limitation is suppressed.

In the configuration described above, the over-revolution of the internal combustion engine can be suppressed by limiting the second hydraulic pressure and switching the switching valve to the normal position. However, the switching valve may be switched to the failure position and downshift to the specific gear shift stage may occur immediately after the second hydraulic pressure rises due to the stepping on the accelerator pedal or the like. In this case, the second hydraulic pressure is to be limited again so that the switching valve is switched to the normal position. However, in this case, the switch to the failure position due to the rise in the second hydraulic pressure and the switch to the normal position due to the limitation of the second hydraulic pressure may be repeated insofar as the high-speed stages (M+1- to N-speed stages) are formed.

The control device described above may continue limiting the second hydraulic pressure, even after the switching valve is switched to the normal position, until the gear shift stage that is set according to the traveling state of the vehicle becomes a target gear shift stage corresponding in advance to the specific gear shift stage which is formed when the switching valve is switched to the failure position during the partial failure.

In the example described above, the "target gear shift stage" may be the 1- to M-speed stages corresponding to the specific low-speed stages.

According to this configuration, the limitation of the second hydraulic pressure continues until the gear shift stage after the switch of the switching valve to the normal position becomes the target gear shift stage where the over-revolution does not occur, and thus the repetition of the switch of the switching valve to the failure position and the switch of the switching valve to the normal position can be suppressed.

The automatic transmission described above has a friction engagement device, and engagement torque capacity of the friction engagement device changes according to the second hydraulic pressure. It is preferable that the output torque of the internal combustion engine be reduced in a case where the engagement torque capacity of the friction engagement device becomes insufficient due to the limitation of the second hydraulic pressure.

The engagement torque capacity of the friction engagement device that is involved in the gear shift is controlled according to input torque of the automatic transmission. The input torque of the automatic transmission is equal to the output torque of the internal combustion engine or a value that is obtained by multiplying the output torque of the internal combustion engine and an amplification factor. According to this configuration, slipping of the friction engagement device can be prevented by reducing the output torque of the internal combustion engine in a case where the engagement torque capacity of the friction engagement device becomes insufficient due to the limitation of the second hydraulic pressure.

In a gasoline engine, for example, the reduction of the output torque of the internal combustion engine may be performed by controlling a throttle valve to a closing side, may be performed by retarding ignition timing, or may be performed by controlling a throttle valve to a closing side and retarding ignition timing at the same time.

As described above, over-revolution attributable to downshift to a specific gear shift stage can be suppressed by a simple configuration according to the control device for a vehicle according to the invention.

What is claimed is:
1. A control device for a vehicle, the vehicle being provided with an internal combustion engine, and an automatic transmission, the automatic transmission having a switching valve switched between a normal position and a failure position according to a first hydraulic pressure and a second hydraulic pressure, the first hydraulic pressure being hydraulic pressure supplied to the switching valve by controlling a first valve, the second hydraulic pressure being hydraulic pressure supplied to the switching valve by controlling a second valve, the first valve being a normally closed solenoid valve, the second valve being a normally open solenoid valve, the switching valve being configured to be switched from the normal position to the failure position during all failure in which all of the solenoid valves including the first valve and the second valve are de-energized, the automatic transmission being configured to be set to gear shift stages corresponding to traveling states of the vehicle when the switching valve is at the normal position, and the automatic transmission being configured to be set to specific gear shift stages corresponding in advance to the respective gear shift stages when the switching valve is at the failure position, the control device comprising:
an electronic control unit configured to limit the second hydraulic pressure such that the switching valve is switched to the normal position when following conditions i) and ii) are satisfied;
i) during partial failure in which the first valve is de-energized, and
ii) when the switching valve is switched to the failure position due to the second hydraulic pressure and the automatic transmission is downshifted to the specific gear shift stage not corresponding to a current gear shift stage.

2. The control device according to claim 1,
wherein the electronic control unit is configured to limit the second hydraulic pressure such that the switching valve is switched to the normal position when the following conditions iii) and iv) are satisfied:
iii) during the partial failure, and
iv) when the automatic transmission is downshifted to the specific gear shift stage not corresponding to the current gear shift stage and an output speed of the internal combustion engine becomes larger than or equal to a predetermined speed.

3. The control device according to claim 1,
wherein the electronic control unit is configured to continue limiting the second hydraulic pressure, after the switching valve is switched to the normal position, until the following condition v) is satisfied:
v) the gear shift stage set according to the traveling state of the vehicle becomes equal to a target gear shift stage, wherein the target shift stage corresponds to the specific gear shift stage in advance, and the specific gear shift stage is set when the switching valve is switched to the failure position during the partial failure.

4. The control device according to claim 1,
wherein the automatic transmission has a friction engagement device with engagement torque capacity changing according to the second hydraulic pressure, and
the electronic control unit is configured to reduce output torque of the internal combustion engine in a case where the engagement torque capacity of the friction engagement device becomes insufficient due to the limitation of the second hydraulic pressure by the electronic control unit.

5. A control method for a vehicle, the vehicle being provided with an internal combustion engine, an automatic transmission, and an electronic control unit, the automatic transmission having a switching valve switched between a normal position and a failure position according to a first hydraulic pressure and a second hydraulic pressure, the first hydraulic pressure being hydraulic pressure supplied to the switching valve by controlling a first valve, the second hydraulic pressure being hydraulic pressure supplied to the switching valve by controlling a second valve, the first valve being a normally closed solenoid valve, the second valve being a normally open solenoid valve, the switching valve being configured to be switched from the normal position to the failure position during all failure in which all of the solenoid valves including the first valve and the second valve are de-energized, the automatic transmission being configured to be set to gear shift stages corresponding to traveling states of the vehicle when the switching valve is at the normal position, and the automatic transmission being configured to be set to specific gear shift stages corresponding in advance to the respective gear shift stages when the switching valve is at the failure position, the control method comprising:
limiting the second hydraulic pressure by the electronic control unit such that the switching valve is switched to the normal position when following conditions i) and ii) are satisfied;
i) during partial failure in which the first valve is de-energized, and
ii) when the switching valve is switched to the failure position due to the second hydraulic pressure and the automatic transmission is downshifted to the specific gear shift stage not corresponding to a current gear shift stage.

* * * * *